3,254,076
6 - TRIFLUOROMETHYL - 7 - SULFAMYL - 3,4 - DI-HYDRO - 1,2,4 - BENZOTHIADIAZINE - 1,1 - DI-OXIDES AND SALTS THEREOF

Frantz Lund, Kongens Lyngby, and Wagn Ole Godtfredsen, Copenhagen Brh., Denmark, assignors to Løvens Kemiske Fabrik Ved A. Kongsted, Ballerup, Denmark
No Drawing. Filed Jan. 22, 1960, Ser. No. 3,985
Claims priority, application Great Britain, Aug. 13, 1958, 26,063/58; Sept. 25, 1958, 28,199/58; Sept. 26, 1958, 30,897/58; Nov. 12, 1958, 36,437/58; Nov. 25, 1958, 37,997/58; Jan. 21, 1959, 2,314/59; June 18, 1959, 21,027/59, Patent 863,474
9 Claims. (Cl. 260—243)

This application is a continuation-in-part of our copending prior application Serial No. 812,096, filed may 11, 1959, now abandoned.

There are now copending two United States patent applications by us claiming 6-trifluoromethyl-7-sulfamyl-3,4 - dihydro - 1,2,4 - benzothiadiazine-1,1-dioxide compounds other than those claimed herein, and any claims involving any such other subject matter will be found in one of them, rather than this present application:

(1) Our now copending U.S. application Serial No. 831,949, filed August 6, 1959, for Substituted Dihydrobenzothiadiazines, has as its subject matter such compounds having an aromatically substituted aliphatic radical in the 3-position, and the alkali metal salts thereof, and claims relating to that subject matter will be found therein.

(2) Our now copending U.S. application Serial No. 3,986, filed January 22, 1960, for Substituted Dihydrobenzothiadiazines, has as its subject matter certain 6-trifluoromethyl - 7 - sulfamyl-3,4-dihydro-1,2,4-benzothiadiazine-1,1-dioxide compounds which are spiro compounds, as a result of spiro substitution in the 3-position, and their alkali metal salts, as well as certain other 3-spiro compounds which are likewise 7-sulfamyl-3,4-dihydro-1,2,4-benzothiadiazine-1,1-dioxide compounds or their alkali metal salts but which each have some particular other thing instead of trifluoromethyl in the 6-position. Claims relating to such subject matter will be found therein.

This invention relates to novel 6-trifluoromethyl-7-sulfamyl-3,4-dihydro-1,2-benzothiadiazine-1,1-dioxides.

The invention more particularly relates to compounds of the general formula:

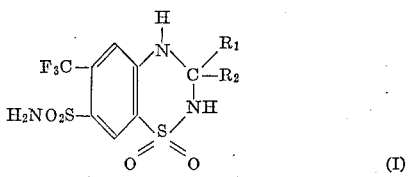

(I)

and alkali metal salts thereof, wherein $R_1$ is selected from the group consisting of hydrogen and methyl; and when $R_1$ is hydrogen, $R_2$ is selected from the group consisting of hydrogen; alkyl groups having 1 to 13 carbon atoms inclusively; alkenyl groups having 2 to 13 carbon atoms inclusively; cyclohexyl; halo-alkyl groups having 1 to 6 carbon atoms inclusively; hydroxyalkyl groups and nitroalkyl groups having 1 to 5 carbon atoms inclusively; alkoxyalkyl groups having 2 to 8 carbon atoms inclusively; alkanoylalkyl groups having 3 to 9 carbon atoms inclusively; carbalkoxy groups, carbalkoxyalkyl groups, and dicarbalkoxyalkyl groups having not more than 7 carbon atoms; acyl groups having from 2 to 8 carbon atoms; and pyridyl groups; and when $R_1$ is methyl, $R_2$ is selected from the group consisting of methyl, ethyl, lower haloalkyl groups, carbalkoxy groups, carbalkoxyalkyl groups and lower acyl groups.

The new dihydrobenzothiadiazines of this invention are physiologically active compounds which exert strongly saluretic and diuretic effects in human beings. Thus, the compounds of the invention are administrable parenterally, and preferably orally, in the treatment of conditions requiring diuretic agents. They show a higher excretion of sodium ions without causing a higher excretion of potassium and bicarbonate ions, compared to the corresponding 6-chloro compounds.

It has been found that the compounds of Formula I in which $R_1$ is hydrogen and $R_2$ is alkyl show the highest saluretic activity when the alkyl group contains 4 or 5 carbon atoms. Furthermore, it has been found that the compounds of Formula I in which $R_1$ is selected from the group consisting of hydrogen and methyl, and $R_2$ is selected from the group consisting of chloromethyl and bromomethyl likewise show a particularly high activity.

The compounds of the Formula I can be produced by reacting 5-trifluoromethyl-2,4-disulfamylaniline with a compound of the general formula $R_1$—CO—$R_2$ in which $R_1$ and $R_2$ are as hereinbefore defined, or a reactive derivative thereof, as more fully described hereinafter, thereby directly yielding the compounds of this invention. Thus, 5-trifluoromethyl-2,4-disulfamylaniline is reacted with an aldehyde or a ketone, or a reactive derivative thereof.

5-trifluoromethyl-2,4-disulfamylaniline can be prepared, as more fully described in the examples following, by interacting $\alpha,\alpha,\alpha$-trifluoro-m-toluidine with chlorosulfonic acid and treating the resulting 5-trifluoromethyl-2,4-disulfonyl chloride with ammonia.

Among the aldehydes suitable for producing the compounds of the invention may be mentioned: alkanals, such as formaldehyde, acetaldehyde, propionaldehyde, n-butyraldehyde, isobutyraldehyde, valeraldehyde and hexahydrobenzaldehyde; alkenals, such as acrolein, methacrolein, crotonaldehyde, and 6-heptenal; halo-alkanals, such as chloroacetaldehyde, 2-chloropropionaldehyde, 2- and 4-chlorobutyraldehyde, 2- and 4-chloro-valeraldehyde, and 2-, 4- and 7-chloroenanthaldehyde; hydroxylalkanals, such as glycolic aldehyde and 6-hydroxyhexanal; nitroalkanals, such as 4-nitrobutyraldehyde and 4-nitrohexanal; alkoxyalkanals, particularly lower alkoxy-lower alkanals, such as methoxyacetaldehyde, ethoxyacetaldehyde, $\beta$-methoxypropionaldehyde, and $\beta$-methoxy-n-butyraldehyde; alkanoylalkanals, such as methylglyoxal, acetoacetaldehyde, propionylacetaldehyde, and $\delta$-hexanoyl-n-butyraldehyde; aromatic aldehydes, such as benzaldehyde, o-, m- and p-tolualdehyde, and hydroxy- or lower alkoxybenzaldehyde (e.g. salicylaldehyde and anisaldehyde); and furfural and pyridyl-aldehydes.

Among the ketones suitable for producing the compounds of the invention may be mentioned: Alkanones, such as acetone, methylethylketone, haloalkanones, such as chloroacetone; 2,3-butanedione; esters of ketoalkanoic acids, particularly lower alkyl esters of keto-lower alkanoic acids, such as the methyl, ethyl, n-propyl, and n-butyl esters of pyruvic acid, acetoacetic acid and carbonylmalonic acid.

In addition to the aldehydes and ketones mentioned hereinbefore, reactive forms of these compounds may also be used. Thus, polymeric forms, such as trioxane and paraformaldehyde; acetals or ketals, particularly a di-(lower alkyl) acetal or ketal; and enol ethers, enol esters or $\alpha$-haloalkylethers may be empoyed. Furthermore, the aldehyde may be replaced by a substance which otherwise is capable of reacting in analogy to the same, for example methylene iodide. The reaction is preferably conducted in the presence of an acid catalyst, such as hydrochloric, phosphoric, n-toluene-sulfonic, trichloroacetic or sulfuric acid.

Furthermore, if an alkali metal salt is desired, it can be formed by the general method disclosed in U.S. Patent No. 2,809,194 by interacting the free dihydrobenzothiadiazine with an alcoholic alkali metal hydroxide (e.g. potassium hydroxide), whereby the alkali metal salt is formed.

The following examples illustrate the invention (all temperatures being in centigrades):

EXAMPLE 1

*6-trifluoromethyl-7-sulfamyl-3,4-dihydro-1,2,4-benzothiadiazine-1,1-dioxide*

(a) *Preparation of 5-trifluoromethylaniline-2,4-disulfonyl chloride.*—113 ml. of chlorosulfonic acid was cooled in an ice-bath, and to the acid was added dropwise while stirring 26.6 g. of α,α,α-trifluoro-m-toluidine. 105 g. of sodium chloride was added during 1–2 hours, whereafter the temperature of the reaction mixture was raised slowly to 150–160°, which temperature was maintained for three hours. After cooling the mixture, ice-cooled water was added, whereby 5-trifluoromethylaniline-2,4-disulfonyl chloride separated out from the mixture.

(b) *Preparation of 5 - trifluoromethyl-2,4-disulfamyl-aniline.*—The 5-trifluoromethylaniline-2,4-disulfonyl chloride obtained in step *a* was taken up in ether and the ether solution dried with magnesium sulfate. The ether was removed from the solution by distillation, the residue was cooled to 0° C., and 60 ml. of ice-cooled, concentrated ammonia water was added while stirring. The solution was then heated for one hour on a steam-bath and evaporated in vacuo to crystallization. The crystallized product was 5-trifluoromethyl-2,4-disulfamylaniline, which was filtered off, washed with water and dried in a vacuum exsiccator over phosphorus pentoxide. After recrystallization from a mixture of 30% ethanol and 70% water the compound had a M.P. of 247–248°.

(c) *Preparation of 6-trifluoromethyl-7-sulfamyl-3,4-dihydro-1,2,4-benzothiadiazine-1,1-dioxide.*—3.2 g. of 5-trifluoromethyl-2,4-disulfamylaniline was added to a solution of 0.33 g. of paraformaldehyde in 25 ml. of ethyl-cellosolve (2-methoxy-ethanol) together with a catalytic amount of p-toluenesulfonic acid, and the mixture was boiled with reflux for five hours. The solvent was then distilled off in vacuo, and the residue triturated with 30 ml. of ethyl acetate. 6-trifluoromethyl-7-sulfamyl-3,4-dihydro-1,2,4-benzothiadiazine-1,1-dioxide crystallized out. After recrystallization from methanol/water the substance had a M.P. of 272–273°.

EXAMPLE 2

*6 - trifluoromethyl - 7 - sulfamyl - 3,4 - dihydro - 1,2,4-benzothiadiazine - 1,1 - dioxide.*—3.2 g. of 5 - trifluoromethyl-2,4-disulfamylaniline were dissolved in a mixture of 25 ml. of 99% ethanol and 10 ml. of ethylal. A catalytic amount of p-toluenesulfonic acid was added, and the solution was boiled with reflux overnight. The solvent was removed in vacuo. By recrystallization of the crude residue from methanol/water the desired substance was obtained with a M.P. of 271–272° C.

EXAMPLE 3

*6 - trifluoromethyl - 7 - sulfamyl - 3,4 - dihydro - 1,2,4-benzothiadiazine - 1,1 - dioxide.*—To a solution of 3.2 g. of 5-trifluoromethyl-2,4-disulfamylaniline in 50 ml. of 99% ethanol was added 3 g. of sodium formaldehyde sulphoxylate (Rongalite C), and the resulting suspensions was boiled with reflux while stirring for 16 hours. After cooling, 100 ml. of water was added, and most of the ethanol was removed in vacuo. The precipitate thereby formed was filtered off and washed with water. By recrystallization from methanol/water the desired substance was obtained with a M.P. of 270–271.5° C.

EXAMPLE 4

*6 - trifluoromethyl - 7 - sulfamyl - 3,4 - dihydro - 1,2,4-benzothiadiazine - 1,1 - dioxide.*—A mixture of 1.0 g. of 5-trifluoromethyl-2,4-disulfamylaniline, 0.25 g. of 35% aqueous formaldehyde solution and 100 ml. of water was boiled with reflux for 18 hours. After cooling, the crystals were filtered off, washed on the filter with 2×5 ml. of water and dried at 100° C. Thereby desired substance was obtained with a M.P. of 271–273° C.

EXAMPLE 5

*6 - trifluoromethyl - 7 - sulfamyl - 3,4 - dihydro - 1,2,4-benzothiadiazine - 1,1 - dioxide.*—To a solution of 16 g. of sodium hydroxide in 1200 ml. of water was added 128 g. of 5-trifluoromethyl-2,4-disulfamylaniline. The mixture was heated to the boiling point, and to the clear solution thus obtained 33.5 ml. of a 36% aqueous formaldehyde solution was added. The mixture was boiled with reflux for 4 hours and cooled to 55° C. 20% aqueous sulfuric acid was then added while stirring until a pH of 5–6 had been reached. The resulting suspension was filtered, the filter cake was washed with water, and the resulting product was dried at 90–100° C. The desired product thus obtained had a M.P. of 277–273° C.

EXAMPLE 6

*6 - trifluoromethyl - 7 - sulfamyl - 3,4 - dihydro - 1,2,4-benzothiadiazine - 1,1 - dioxide.*—3.2 g. of 5 - trifluoromethyl - 2,4 - disulfamylaniline, 1.21 ml. of methylene iodide and 2.8 ml. of triethylamine were dissolved in 25 ml. of dioxane, and the solution was boiled with reflux for 5 hours. The reaction mixture was evaporated in vacuo to dryness, and the residue was dissolved in methanol and precipitated by addition of water. The precipitate thereby formed was boiled with a small quanity of ethyl acetate and filtered off. The precipitate was recrystallized from methanol/water, whereby the desired substance was obtained with a M.P. of 260–263° C.

EXAMPLE 7

*3 - methyl - 6 - trifluoromethyl - 7 - sulfamyl - 3,4 - dihydro - 1,2,4 - benzothiadiazine - 1,1 - dioxide.*—3.2 g. of 5-trifluoromethyl-2,4-disulfamylaniline was suspended in a mixture of 25 ml. of ethanol, and 10 ml. of ethylvinylether. A catalytic amount of p-toluenesulfonic acid was added, and the mixture was boiled with reflux for 30 minutes. The solvent was removed in vacuo, and the oily residue crystallized by addition of ethylacetate and hexane. By recrystallization from methanol/water the desired substance was obtained with a M.P. of 240–240.5° C.

EXAMPLE 8

*3 - methyl - 6 - trifluoromethyl - 7 - sulfamyl - 3,4 - dihydro - 1,2,4 - benzothiadiazine - 1,1 - dioxide.*—3.2 g. of 5-trifluoromethyl-2,4-disulfamylaniline and 0.95 g. of vinylacetate were dissolved in 25 ml. of dioxane. A catalytic amount of p-toluenesulfonic acid was added, and the mixture was boiled with reflux for 5 hours. The reaction mixture was dissolved in methanol and precipitated by addition of water. The desired substance was thereby obtained in pure state with a M.P. of 245–246° C.

EXAMPLE 9

*3 - methyl - 6 - trifluoromethyl - 7 - sulfamyl - 3,4 - dihydro - 1,2,4 - benzothiadiazine - 1,1 - dioxide.*—3.2 g. of 5 - trifluoromethyl - 2,4 - disulfamylaniline and 1.2 g. of α-chloroethylethyl ether were dissolved in 20 ml. of dioxane. A catalytic amount of p-toluenesulfonic acid was added, and the mixture was boiled with reflux overnight. The reaction mixture was evaporated to dryness in vacuo, the residue dissolved in methanol and crystallized by addition of water. The desired substance was thereby obtained with a M.P. 240–243° C.

EXAMPLE 10

*3 - ethyl - 6 - trifluoromethyl - 7 - sulfamyl - 3,4 - dihydro - 1,2,4 - benzothiadiazine - 1,1 - dioxide.*—3.2 g. of 5-trifluoromethyl-2,4-disulfamylaniline were added to a solution of 0.79 ml. of propionaldehyde in 30 ml. of 99% ethanol, and the mixture was boiled with reflux for 4½ hours. Already after 2 hours crystals began to separate out. After cooling, the crystals were filtered off and washed with 99% ethanol. The substance was purified by dissolving it in 24 ml. of boiling 2-methoxy-ethanol and precipitating with 10 ml. of water. Thereby the desired substance was obtained with a M.P. of 255.5–256° C.

EXAMPLE 11

*3 - n - propyl 6 - trifluoromethyl - 7 - sulfamyl - 3,4 - dihydro - 1,2,4 - benzothiadiazine - 1,1 - dioxide.*—3.2 g. of 5-trifluoromethyl-2,4-disulfamylaniline were added to a solution of 0.89 ml. of n-butyraldehyde in 20 ml. of 99% ethanol together with a catalytic amount of p-toluenesulfonic acid, and the mixture was boiled with reflux overnight. Thereafter the ethanol was distilled off in vacuo to dryness, and the residue was recrystallized from methanol/water. Thereby the desired substance was obtained with a M.P. of 232–233° C.

EXAMPLE 12

*3 - isopropyl - 6 - trifluoromethyl - 7 - sulfamyl - 3,4 - dihydro - 1,2,4 - benzothiadiazine - 1,1 - dioxide.*—3.2 g. of 5-trifluoromethyl-2,4-disulfamylaniline and 2 drops of piperidine were added to a solution of 1.0 ml. of isobutyraldehyde in 20 ml. of 99% ethanol, and the mixture was boiled with reflux for 5 hours. Thereafter the reaction mixture was poured into 200 ml. of water, the solution was left standing overnight in an ice-box, and the precipitate thereby formed was filtered off. By recrystallization from ethanol the desired substance was obtained with a M.P. of 244–245° C.

EXAMPLE 13

*3 - n - hexyl - 6 - trifluoromethyl - 7 - sulfamyl - 3,4 - dihydro - 1,2,4 - benzothiadiazine - 1,1 - dioxide.*—Following the procedure of Example 11, but substituting n-enanthaldehyde for the n-butyraldehyde, there is obtained 3-n-hexyl - 6 - trifluoromethyl - 7 - sulfamyl - 3,4 - dihydro-1,2,4 - benzothiadiazine - 1,1 - dioxide with a M.P. of 178–179° after recrystallization from dioxane/hexane.

EXAMPLE 14

*3 - n - butyl - 6 - trifluoromethyl - 7 - sulfamyl - 3,4 - dihydro - 1,2,4 - benzothiadiazine - 1,1 - dioxide.*—3.2 g. of 5-trifluoromethyl-2,4-disulfamylaniline and 1.15 ml. of n-valeraldehyde were dissolved in 20 ml. of dioxane. A catalytic amount of p-toluenesulfonic acid was added, and the mixture was boiled with reflux for 5 hours. After cooling, the reaction product was precipitated by addition of water and filtered off. By recrystallization from ethyl acetate/hexane and subsequently from methanol/water the desired substance was obtained with a M.P. of 216.5–217.5° C.

EXAMPLE 15

*3 - n - pentyl - 6 - trifluoromethyl - 7 - sulfamyl - 3,4-dihydro - 1,2,4 - benzothiadiazine - 1,1 - dioxide.*—Following the same procedure, but substituting 1.35 ml. of caproaldehyde for the n-valeraldehyde the desired substance was obtained with a M.P. of 190–191.5°, by three recrystallizations from methanol/water.

EXAMPLE 16

*3 - cyclohexyl - 6 - trifluoromethyl - 7 - sulfamyl - 3,4-dihydro - 1,2,4 - benzothiadiazine - 1,1 - dioxide.*—A mixture of 3.2 g. of 5-trifluoromethyl-2,4-disulfamylaniline and 2.05 g. of hexahydrobenzaldehyde diethyl acetal was dissolved in 25 ml. of dioxane, a catalytic amount of p-toluenesulfonic acid was added, and the solution was boiled with reflux overnight. After cooling, a mixture of methylene chloride and hexane was added, and the precipitate was recrystallized twice from methanol/water, whereby the desired substance was obtained with a M.P. of 258–259.5° C.

EXAMPLES 17 AND 18

Following the procedure of Example 1, step (c), but substituting the required carbonyl reactant for paraformaldehyde, the designated 3 - Y - 6 - trifluoromethyl-7-sulfamyl - 3,4 - dihydro - 1,2,4 - benzothiadiazine - 1,1 - dioxide was obtained:

| Example | Y | M.P. | Recrystallized from— |
|---|---|---|---|
| 17 | n-Tridecyl | No. M.P. | Methanol/water. |
| 18 | 1'-Propenyl | 213.5–215 | Ethyl acetate/hexane. |

EXAMPLE 19

*3 - δ - hydroxybutyl - 6 - trifluoromethyl - 7 - sulfamyl-3,4 - dihydro - 1,2,4 - benzothiadiazine - 1,1 - dioxide.*—6.4 g. of 5-trifluoromethyl-2,4-disulfamylaniline and 2.25 g. of δ-hydroxypentanal were dissolved in 30 ml. of dimethylformamide. A catalytic amount of p-toluenesulfonic acid was added, and the mixture was heated to 70° C. for 7 hours. Thereupon the dimethylformamide was distilled off in vacuo. The residue was dissolved in methyl isobutyl ketone and precipitated by addition of methylene chloride and hexane. By recrystallization from acetone/hexane the desired substance was obtained with a M.P. of 175–175.5° C.

EXAMPLE 20

*3-chloromethyl-6-trifluoromethyl-7-sulfamyl - 3,4 - dihydro-1,2,4-benzothiadiazine-1,1-dioxide.*—To a solution of 3.2 g. of 5-trifluoromethyl-2,4-disulfamylaniline in 50 ml. of dioxane was added a catalytic amount of p-toluenesulfonic acid followed by 4 ml. of a 40% aqueous solution of chloroacetaldehyde. The mixture was boiled with reflux for 4 hours, whereupon the solvent was removed by distillation in vacuo. The residue was triturated with chloroform, and the crystalline product thus obtained was recrystallized from ethylacetate/hexane. Thereby the resired substance was obtained with a M.P. of 245–245.5° C. (decomposition).

EXAMPLE 21

*3-bromomethyl-6-trifluoromethyl-7-sulfamyl - 3,4 - dihydro-1,2,4-benzothiadiazine-1,1-dioxide.*—3.2 g. of 5-trifluoromethyl-2,4-disulfamylaniline and 2.2 g. of bromoacetaldehyde diethyl acetal were dissolved in 30 ml. of dioxane. A catalytic amount of p-toluenesulfonic acid was added, and the mixture was boiled with reflux overnight. After cooling, the reaction product was precipitated by addition of methylene chloride and hexane. By recrystallization from methanol/water the desired substance was obtained with a M.P. of 209.5–210° C.

EXAMPLE 22

*3(β-methoxyethyl)-6-trifluoromethyl-7-sulfamyl - 3,4-dihydro-1,2,4-benzothiadiazine-1,1-dioxide.*—3.2 g. of 5-trifluoromethyl-2,4-disulfamylaniline and 1.76 g. of β-methoxypropionaldehyde were dissolved in 50 ml. of methanol. A catalytic amount of p-toulenesulfonic acid was added, and the mixture was boiled with reflux for 7 hours. Thereupon the methanol was distilled off in vacuo, and the residue was dissolved in a mixture of dioxane and methylene chloride and precipitated by addition of hexane. After repeating this procedure once more, the precipitate was recrystallized from isopropanol, and the desired substance was obtained with a M.P. of 188–190° C.

EXAMPLE 23

*3-(γ-nitropentyl)-6-trifluoromethyl - 7 - sulfamyl -3,4-dihydro-1,2,4-benzothiadiazine-1,1-dioxide.*—3.2 g. of 5-trifluoromethyl-2,4-disulfamylaniline and 1.5 g. of γ-nitrocaproaldehyde were dissolved in 30 ml. of dioxane. A catalytic amount of p-toluenesulfonic acid was added, and the mixture was boiled with reflux overnight. After cooling the reaction product was precipitated by addition of water. By recrystallization of the residue from methanol/water the desired substance was obtained with a M.P. of 234.5–235° C.

EXAMPLE 24

3-acetonyl-6-trifluoromethyl-7-sulfamyl - 3,4-dihydro-1,2,4-benzothiadiazine-1,1-dioxide.—A mixture of 3.2 g. of 5- trifluoromethyl-2,4-disulfamylaniline, 2.65 g. of acetoacetaldehyde diethyl acetal, a catalytic amount of p-toluenesulfonic acid and 30 ml. of dioxane was boiled with reflux for 16 hours. The solvent was removed by distillation in vacuo, and the residue was recrystallized by dissolving it in a mixture of n-propanol and methylene chloride and precipitating by addition of hexane. The desired substance was thereby obtained with a M.P. of 208–209° C. (decomposition).

EXAMPLE 25

3-phenyl-6-trifluoromethyl-7-sulfamyl - 3,4 - dihydro-1,2,4-benzothiadiazine-1,1-dioxide.—3.2 g. of 5-trifluoromethyl-2,4-disulfamylaniline is dissolved in a mixture of 25 ml. of ethanol and 2.02 ml. of benzaldehyde. A catalytic amount of p-toluenesulfonic acid was added, and the mixture was boiled with reflux for 16 hours. After cooling, hexane was added, and the precipitate was filtered off and recrystallized several times from ethanol/hexane to give the desired product with a M.P. of 218.5–219.5° C.

EXAMPLE 26

3-(2'-furyl)-6-trifluoromethyl-7-sulfamyl - 3,4-dihydro-1,2,4-benzothiadiazine-1,1-dioxide.—3.2 g. of 5-trifluoromethyl-2,4-disulfamylaniline and 1.06 g. of freshly distilled furfural were dissolved in 20 ml. of 99% ethanol. The mixture was boiled with reflux for 48 hours, and after cooling poured into 150 ml. of water The precipitate thereby formed was filtered off and recrystallized from methanol/water. The desired substance was then obtained with a M.P. of 190–192° C.

EXAMPLES 27 and 28

Following the procedure of the above example, but substituting the required carbonyl reactant for furfural, the designated 3-Y-6-trifluoromethyl-7-sulfamyl-3,4-dihydro-1,2,4-benzothiadiazine-1,1-dioxide was obtained.

| Example | Y | M.P. | Recrystallized from— |
| --- | --- | --- | --- |
| 27 | 2'-Pyridyl | 304–306 (dec.) | Methanol/water. |
| 28 | 3'-Pyridyl | 240–241 | Ethanol 99.9%. |

EXAMPLE 29

3,3-dimethyl-6-trifluoromethyl-7-sulfamyl - 3,4 - dihydro-1,2,4-benzothiadiazine-1,1-dioxide.—3.2 g. of 5-trifluoromethyl-2,4-disulfamylaniline was dissolved in 50 ml. of acetone, a catalytic amount of p-toluenesulfonic acid was added, and the solution was boiled with reflux overnight. Thereafter the main part of the acetone was distilled off, and to the concentrated solution water was added. The desired substance was precipitated as a crystalline substance. which was subsequently recrystallized from ethanol/water. The recrystallized substance had a M.P. of 222.5–223.5° C.

EXAMPLE 30

By substituting 10 ml. of 2-methoxy-1-propylene and 20 ml. of dioxane for the acetone and using the procedure of Example 29, the same substance was obtained.

EXAMPLE 31

3-ethyl-3-methyl-6-trifluoromethyl-7-sulfamyl - 3,4-dihydro-1,2,4-benzothiadiazine-1,1-dioxide.—Following the procedure of Example 29, but substituting methyl ethyl ketone for the acetone, there is obtained 3-ethyl-3-methyl-6-trifluoromethyl-7-sulfamyl-3,4-dihydro - 1,2,4 - benzothiadiazine-1,1-dioxide with a M.P. of 212–213° C.

EXAMPLE 32

3-methyl-3-chloromethyl-6-trifluoromethyl - 7 - sulfamyl - 3,4-dihydro-1,2,4-benzothiadiazine-1,1-dioxide.—To a solution of 3.2 g. of 5 - trifluoromethyl - 2,4 - disulfamylaniline in 25 ml. of dioxane was added a catalytic amount of p-toluenesulfonic acid and 5 ml. of chloroacetone. The mixture was boiled with reflux overnight. After cooling, a mixture of methylene chloride and hexane was added, and the precipitate thereby formed was recrystallized twice from methanol/water, whereby the desired substance was obtained with a M.P. of 227–227.5° (decomposition).

EXAMPLE 33

3-methyl-3-carbethoxy-6-trifluoromethyl-7-sulfamyl-3,4-dehydro-1,2,4-benzothiadiazine-1,1-dioxide.—A solution of 3.2 g. of 5-trifluoromethyl-2,4-disulfamylaniline, 5 ml. of ethyl pyruvate and a catalytic amount of p-toluenesulfonic acid in 25 ml. of dioxane was boiled with reflux overnight. The dioxane was removed by distillation in vacuo, and the residue was triturated with chloroform. The precipitate was filtered off and recrystallized from ethyl acetate/hexane. Thereby the desired substance was obtained with a M.P. of 191–194° C.

EXAMPLE 34

3 - dicarbethoxymethyl - 6-trifluoromethyl-7-sulfamyl-3,4-dihydro-1,2,4-benzothiadiazine-1,1-dioxide.—3.2 g. of 5-trifluoromethyl-2,4-disulfamylaniline and 10 ml. of diethyl ethoxymethylene malonate were dissolved in 25 ml. of dioxane. A catalytic amount of p-toluenesulfonic acid was added, and the mixture was boiled with reflux for 5 hours. Thereupon the dioxane was distilled off, and the residue was triturated with methylene chloride. After recrystallization from dioxane/hexane the desired substance was obtained with a M.P. of 232–233° C.

EXAMPLE 35

3 - methyl - 3-carbethoxymethyl-6-trifluoromethyl-7-sulfamyl-3,4-dihydro-1,2,4-benzothiadiazine-1,1-dioxide.—A mixture of 3.2 g. of 5-trifluoromethyl-2,4-disulfamylaniline, a catalytic amount of p-toluenesulfonic acid and 50 ml. of ethyl acetoacetate was heated on a steam-bath overnight. The excess of ethyl acetoacetate was removed by distillation in vacuo, and the residue was triturated with methylene chloride. The crystalline substance thus obtained was recrystallized from dioxane/chloroform/hexane, whereby the desired substance was obtained with a M.P. of 150–152° C.

EXAMPLE 36

Dipotassium salt of 6-trifluoromethyl-7-sulfamyl-3,4-dihydro-1,2,4-benzothiadiazine-1,1-dioxide.—To a solution of 6.6 g. of 85% potassium hydroxide in 100 ml. of 95% ethanol was added gradually with shaking 16.5 g. of 6-trifluoromethyl-7-sulfamyl-3,4-dihydro-1,2,4-benzothiadiazine-1,1-dioxide. The solid dissolved. The resulting alcoholic solution was concentrated in vacuo to yield the dipotassium salt as a free-flowing granular powder.

Similarly, using the equivalent quantity of sodium hydroxide instead of potassium hydroxide, the disodium salt is obtained. Furthermore, if only 3.3 g. of 85% potassium hydroxide is used in Example 36, the monopotassium salt is obtained.

Whenever "pyridyl" is used as a word or part of a word herein, it itself means "any of three univalent radicals $C_5H_4N$ derivable from pyridine by removal of one hydrogen atom," which is the normal meaning of the word.

What is claimed is:

1. A compound of the formula

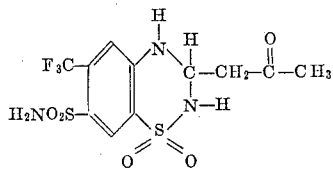

2. A compound selected from the group consisting of dihydrobenzothiadiazines of the formula

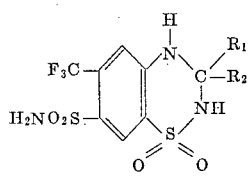

and alkali metal salts thereof, wherein

is selected from the group consisting of $CH_2$, $CH$—$R_4$, and

in which $R_4$ is selected from the group consisting of alkyl radicals having 1 to 13 carbon atoms inclusive; alkenyl radicals having 2 to 13 carbon atoms inclusive; halo-alkyl groups having 1 to 6 carbon atoms inclusive; hydroxyalkyl groups and nitroalkyl groups each having 1 to 5 carbon atoms inclusive; alkoxyalkyl groups having 2 to 8 carbon atoms inclusive; alkanoyl-alkyl groups having 3 to 9 carbon atoms inclusive; carbalkoxyalkyl and dicarbalkoxyalkyl groups each having not more than 7 carbon atoms; and alkanoyl groups having from 2 to 8 carbon atoms; $R_3$ being selected from the group consisting of alkyl groups having 1 to 2 carbon atoms; halo-alkyl groups having 1 carbon atom; carbalkoxy groups which have 2 to 5 carbon atoms inclusive; carbalkoxyalkyl groups which have from 3 to 6 carbon atoms inclusive; and an alkanoyl group which has two carbon atoms.

3. 6-trifluoromethyl-7-sulfamyl-3,4-dihydro-1,2,4-benzothiadiazine-1,1-dioxide.

4. 3-lower alkyl which have from 1 to 13 carbon atoms inclusive-6-trifluoromethyl-7-sulfamyl-3,4-dihydro-1,2,4-benzothiadiazine-1,1-dioxides.

5. 3-n-pentyl-6-trifluoromethyl-7-sulfamyl-3,4-dihydro-1,2,4-benzothiadiazine-1,1-dioxide.

6. 3-halo-lower alkyl which have from 1 to 6 carbon atoms inclusive-6-trifluoromethyl-7-sulfamyl-3,4-dihydro-1,2,4-benzothiadiazine-1,1-dioxides.

7. 3-methyl-3-chloromethyl-6-trifluoromethyl-7-sulfamyl-3,4-dihydro-1,2,4-benzothiadiazine-1,1-dioxide.

8. A compound selected from the group consisting of dihydrobenzothiadiazines of the formula:

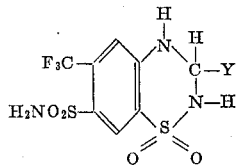

and alkali metal salts thereof, wherein Y is selected from the group consisting of phenyl, hydroxyphenyl, lower alkoxyphenyl, cyclohexyl, furyl and pyridyl groups.

9. A compound of the formula:

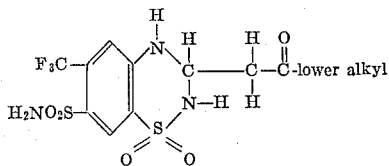

References Cited by the Examiner

UNITED STATES PATENTS 2,809,194    10/1957    Novello _____ 260—243

OTHER REFERENCES

Hobolth et al.: Ugeskr. Laeg., vol. 120, page 1585 (1958).

Sele: Ugeskr. Laeg., vol. 120, page 1592 (1958).

NICHOLAS S. RIZZO, *Primary Examiner.*

IRVING MARCUS, *Examiner.*

G. S. ROSEN, *Assistant Examiner.*